S. LASKEY.

SHIRT-BOSOM.

No. 7,220. Reissued July 11, 1876.

*Witnesses.*
A. McCallum
D. G. Stuart

*Inventor.*
Stephen Laskey
per P. Hennay
Attyl.

N. PETERS, PHOTO-LITHOGRAPHER, WASHINGTON, D. C.

UNITED STATES PATENT OFFICE.

STEPHEN LASKEY, OF BOSTON, MASSACHUSETTS, ASSIGNOR TO HIMSELF AND SOLOMON SIBLEY.

IMPROVEMENT IN SHIRT-BOSOMS.

Specification forming part of Letters Patent No. 155,244, dated September 22, 1874; reissue No. 7,220, dated July 11, 1876; application filed June 22, 1876.

*To all whom it may concern:*

Be it known that I, STEPHEN LASKEY, of Boston, in the county of Suffolk and State of Massachusetts, have invented certain new and useful Improvements in Shirt-Bosoms; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
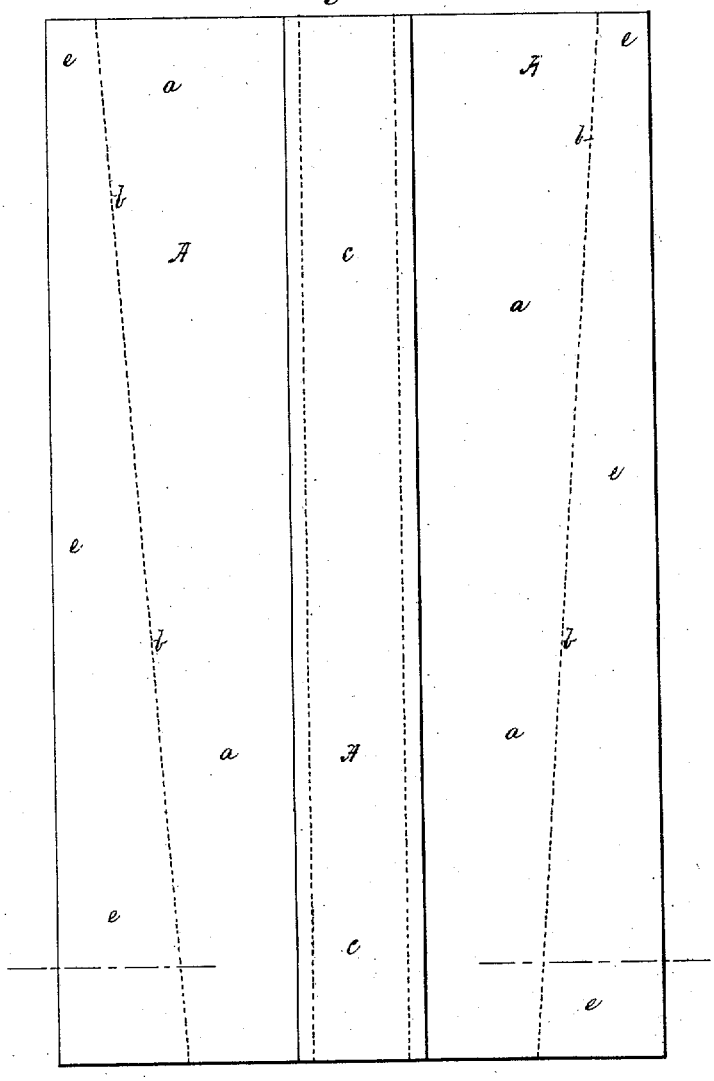
Figure 2:
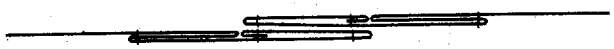

Figure 1 is a plan of my improved shirt-bosom. Fig. 2 is a section on the line *x x* of Fig. 1, enlarged.

Ordinary shirt-bosoms have the edges of their plaits laid parallel to each other. Thus made they are usually attached to the shirt in their rectangular form. When, however, it is desired to set such bosom in a shirt in a shield or tapering form, a portion of the outer plait on each side of the bosom is cut off, which leaves raveled edges, that require to be turned in and sewed together with the edge of the shirt between them. Furthermore, considerable difficulty exists in cutting these plaits to a uniform taper and size, and where the lower portion only of each outer plait is cut off, it is liable to pucker at the junction of the raveled edges with the uncut edge when the bosom is set in. To avoid these objections is the purpose of my invention.

My improvement consists in providing a plaited shirt-bosom with side plaits so formed by the folding of the cloth that the outer edge of the folding shall run from top to bottom in a line inclined toward, instead of being parallel with, the edges of the central plait, and thus form a shield-shaped bosom with an uncut edge capable of being set in a bosom, either in shield or rectangular form.

To enable others skilled in the art to understand and use my invention, I will proceed to describe the manner in which I have carried it out.

In the said drawings, A represents a plated shirt-bosom, each of the under folded outer plaits *a a* of which is folded and stitched on a line, *b b*, inclined toward the center plait *c* from top to bottom. The portion *e* of the bosom outside the line *b b* is of single thickness, its edge *h* being parallel to the edge of the center plait.

When a rectangular bosom is required it is simply necessary to sew each of the edges *h* to the edges of the opening in the shirt made to receive it, while, if a shield-shaped bosom is desired, it is only necessary either to turn under or cut off a strip from the portion *e*, parallel with the inclined line *b b*, so as to leave just margin enough to set the bosom in this form into the shirt, and as the plaits *a a* are already folded on an inclined line, the necessity of cutting them is avoided, while the inclined edges of the plaits *a a* serve as guides by which to cut or on which to turn the bosom to give it the proper shield shape; and I am thus enabled to furnish a made-up plaited shirt-bosom which can be readily set into a shirt, either in a rectangular or shield form, without cutting the plaits — a desideratum heretofore unattained.

I do not, broadly, claim a shirt-bosom having its sides sloped or inclined toward the center; but What I do claim as my invention, and desire to secure by Letters Patent as a new article of manufacture, is—

1. A shield-shaped plaited shirt-bosom, the side plaits of which are formed by folding the cloth in such manner that the outer edge of the fold of each of said plaits shall run from top to bottom in a line inclined toward the central plait, substantially as set forth.

2. A shield-shaped plaited shirt-bosom, the side plaits of which are, respectively, folded on their outer edge in a line inclined toward the central plait, and are provided with a margin, *e*, for the purposes set forth.

In testimony that I claim the foregoing I have hereunto set my hand this 18th day of May, 1876.

STEPHEN LASKEY.

Witnesses:

JOS. H. COLBY,

JOSEPH M. GILION.